Dec. 19, 1967   M. J. FERNANDEZ   3,358,803
PARKING METER
Filed Aug. 9, 1965   8 Sheets-Sheet 1
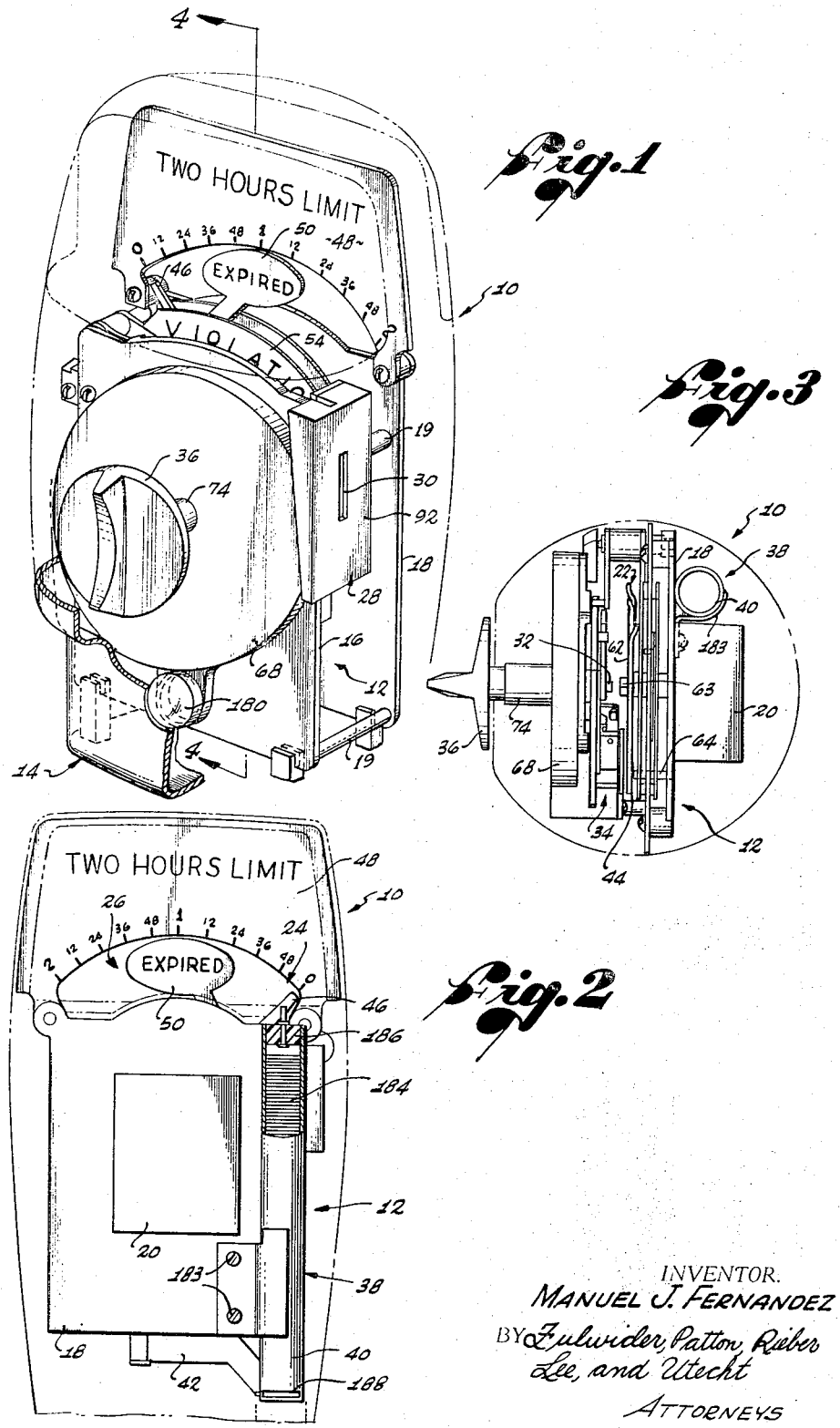
INVENTOR.
MANUEL J. FERNANDEZ
BY Fulwider, Patton, Rieber
Lee, and Utecht
ATTORNEYS Dec. 19, 1967 M. J. FERNANDEZ 3,358,803
PARKING METER
Filed Aug. 9, 1965 8 Sheets-Sheet 2
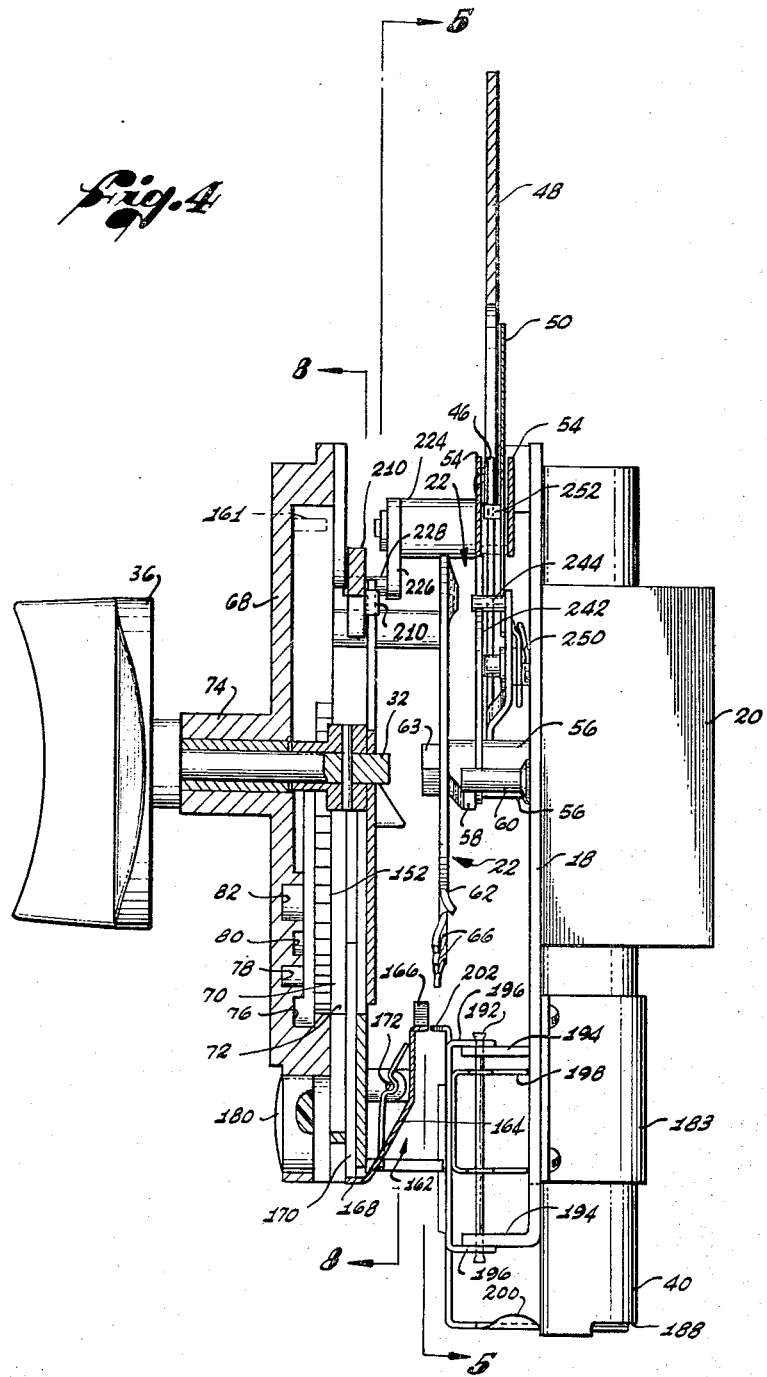
INVENTOR.
MANUEL J. FERNANDEZ
BY Gulwider, Patton, Rieber
Lee, and Utecht
ATTORNEYS Dec. 19, 1967 M. J. FERNANDEZ 3,358,803
PARKING METER
Filed Aug. 9, 1965 8 Sheets-Sheet 5
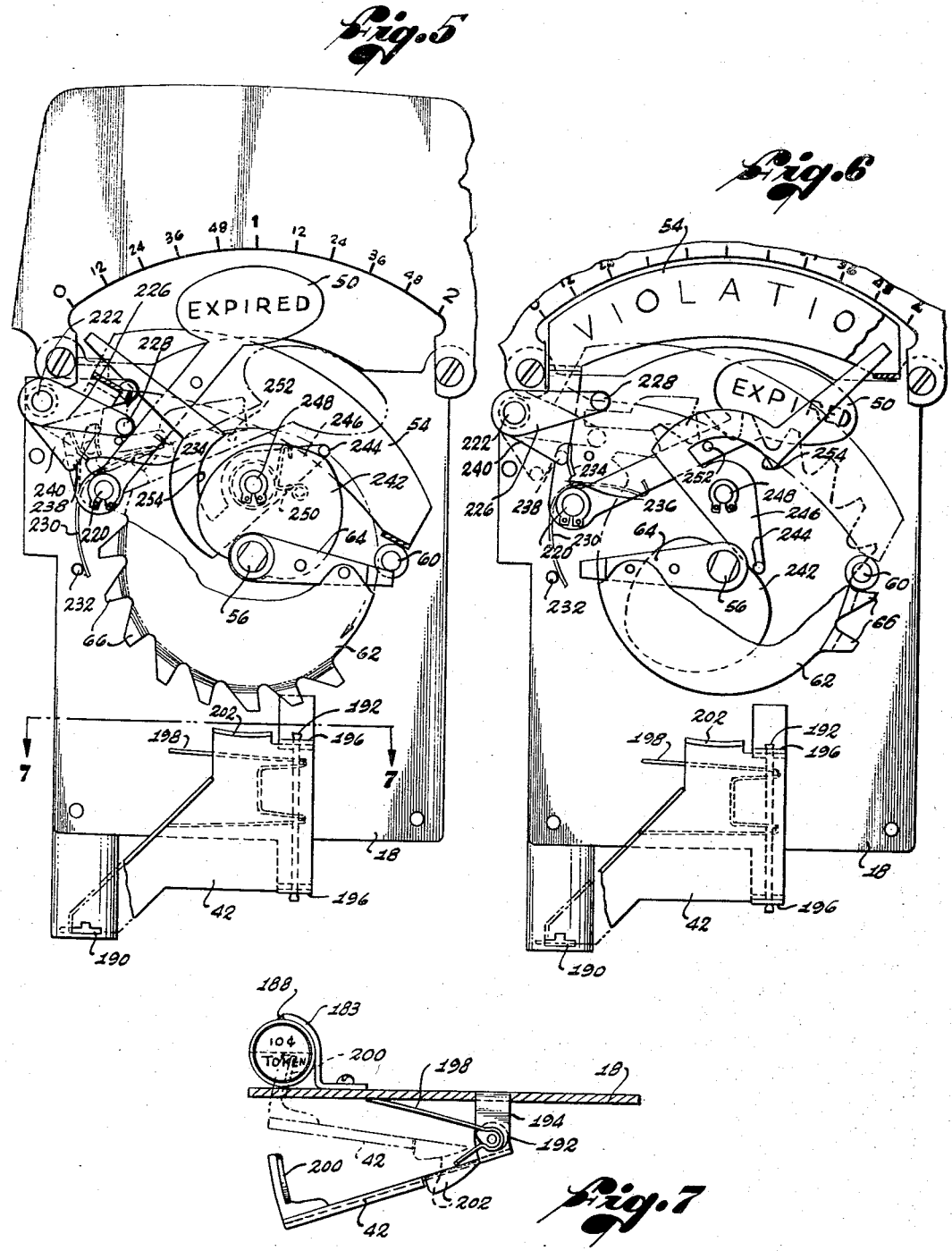
INVENTOR.
MANUEL J. FERNANDEZ
BY Fulwider, Patton, Rieber
Lee, and Utecht
ATTORNEYS

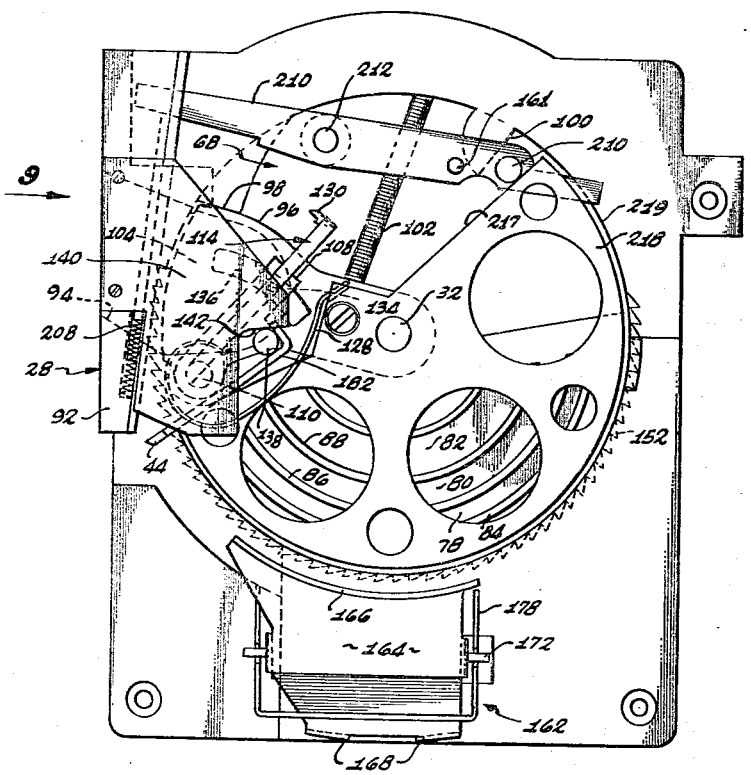
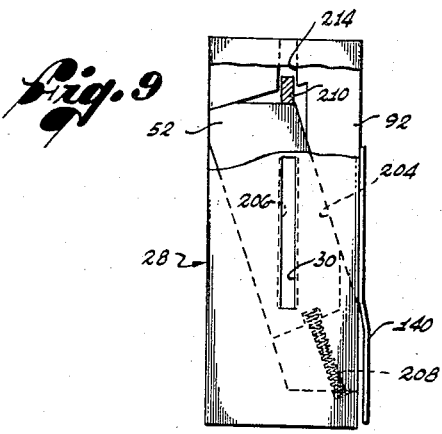
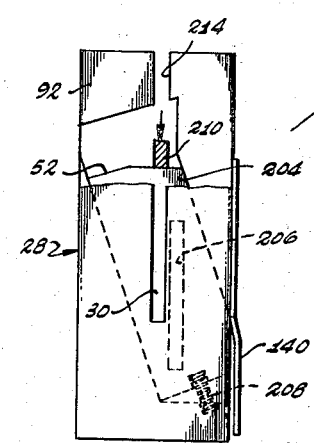

Dec. 19, 1967  M. J. FERNANDEZ  3,358,803
PARKING METER

Filed Aug. 9, 1965  8 Sheets-Sheet 5

INVENTOR.
MANUEL J. FERNANDEZ
BY Zulwider, Patton, Rieber,
Lee, and Utecht
ATTORNEYS

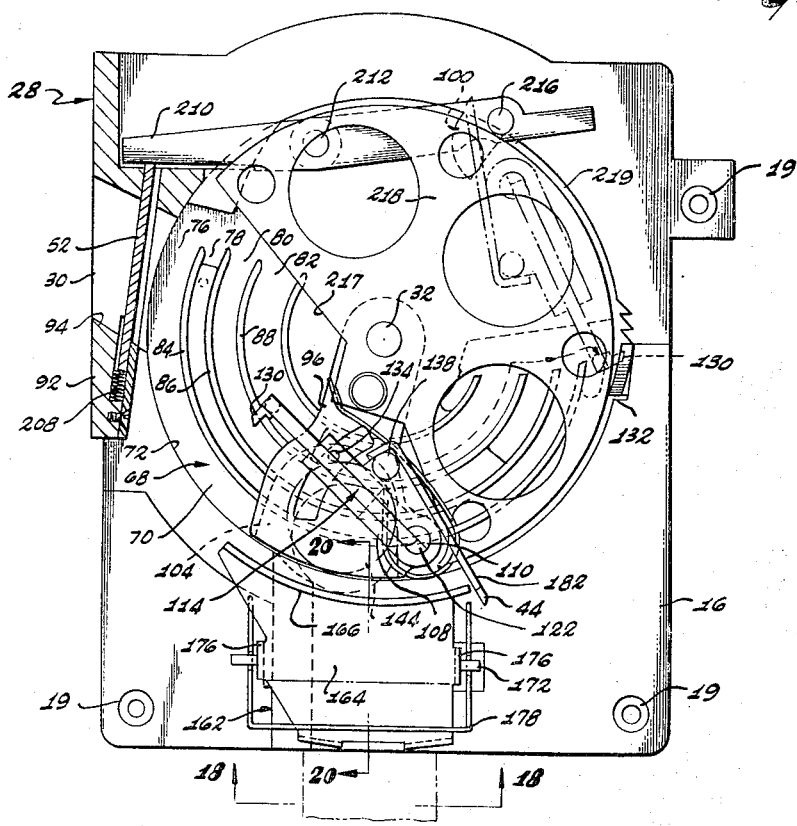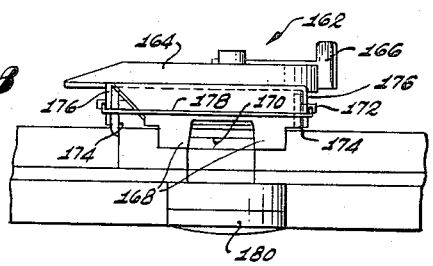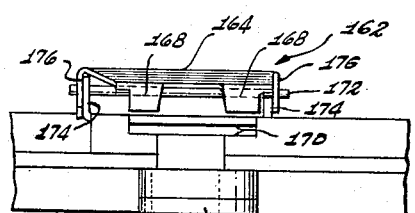

Dec. 19, 1967     M. J. FERNANDEZ     3,358,803
PARKING METER
Filed Aug. 9, 1965     8 Sheets-Sheet 7
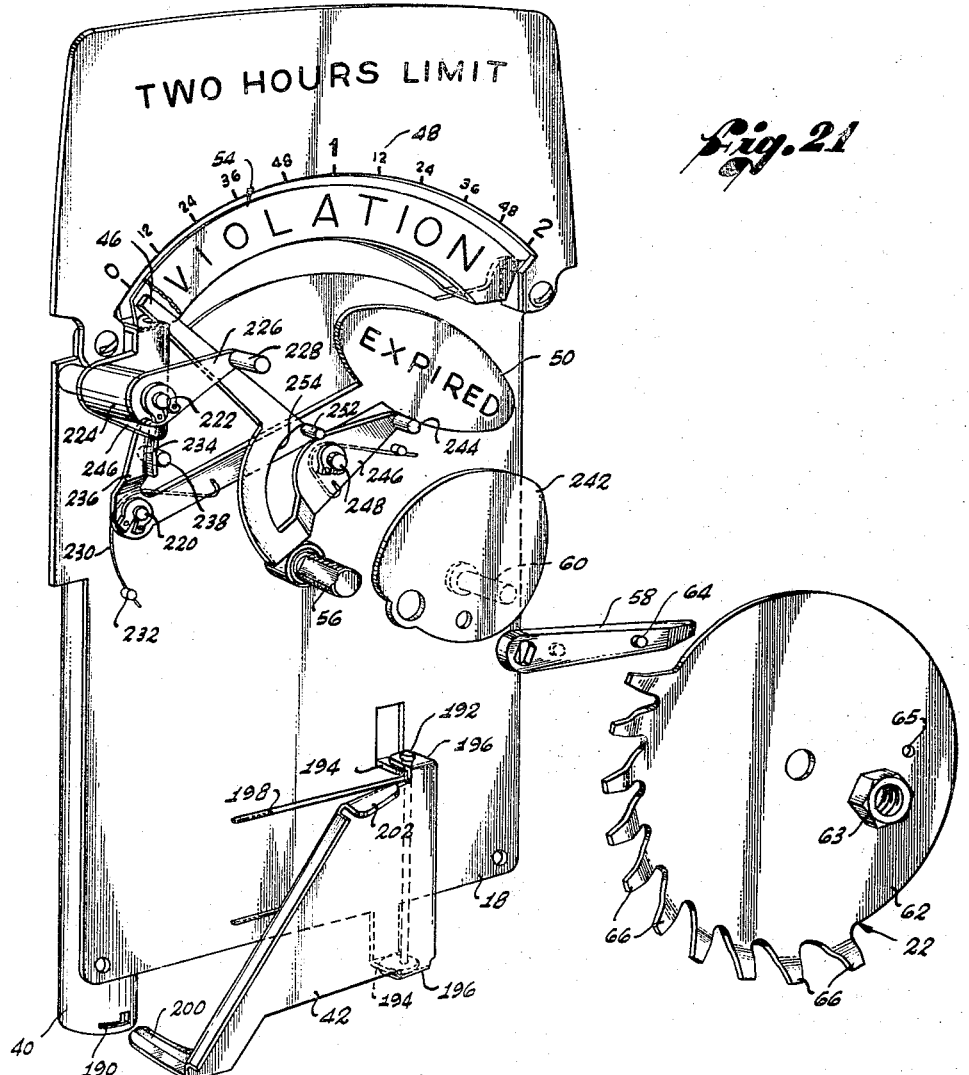
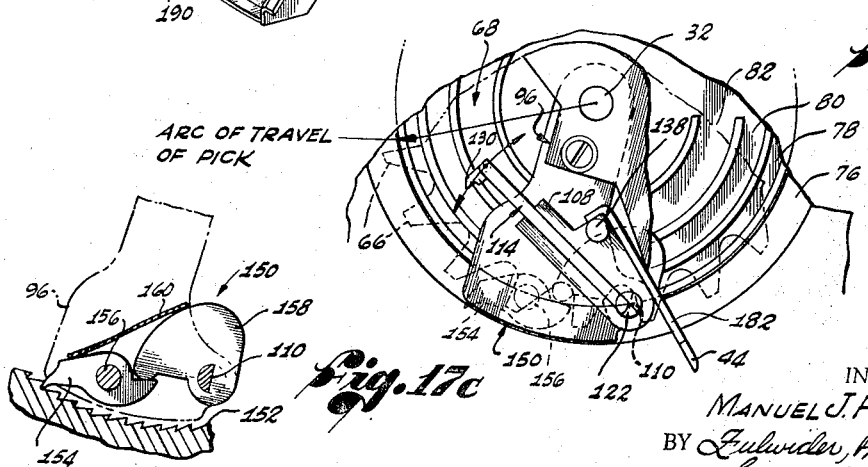
INVENTOR.
MANUEL J. FERNANDEZ
BY Fulwider, Patton, Rieber, Lee, and Utecht
ATTORNEYS Dec. 19, 1967    M. J. FERNANDEZ    3,358,803
PARKING METER
Filed Aug. 9, 1965    8 Sheets-Sheet 8
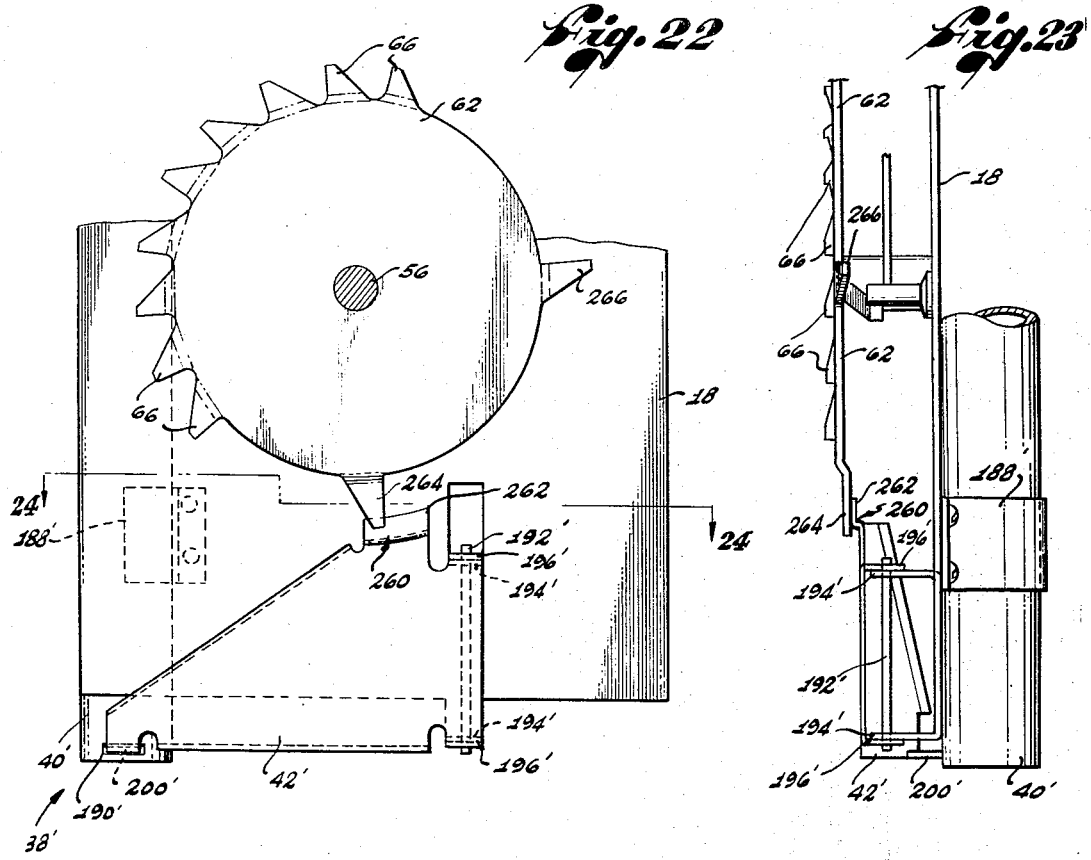
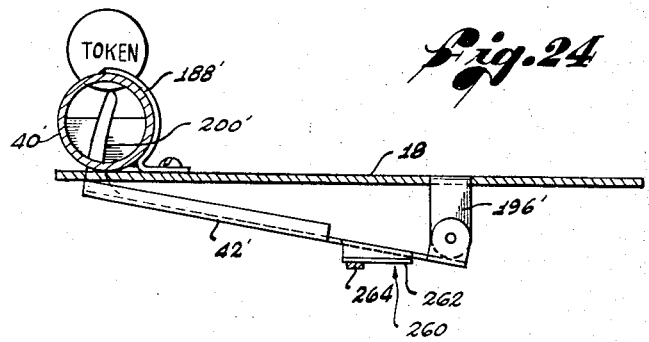
INVENTOR.
MANUEL J. FERNANDEZ
BY Fulwider, Patton, Rieber,
Lee, and Utecht
ATTORNEYS

United States Patent Office 3,358,803
Patented Dec. 19, 1967

3,358,803
PARKING METER
Manuel J. Fernandez, 7009 Maynard Ave.,
Canoga Park, Calif. 91304
Filed Aug. 9, 1965, Ser. No. 478,151
16 Claims. (Cl. 194—85)

The present invention relates to parking meters, and more particularly to a novel hand-operated parking meter having a single slot for receiving all coins.

In recent years, parking meters have come into rather general use, particularly by municipalities as a means for raising extra revenue and for preventing unreasonable use of street and lot parking space. Various forms of parking meters are employed for such purposes, including both automatic and hand-operated parking meters. Basically, an automatic parking meter is a meter which only requires the insertion of a coin into the meter to set a parking meter clock into operation. To accomplish this, such meters utilize either a prewound or electric clock, or a heavily spring biased cam assembly to wind the meter clock upon the deposit of a coin into the meter. Unfortunately, prewound clocks require time consuming and expensive periodic servicing to rewind the clock. Electric clocks require special cabling, usually under sidewalks and streets which represents a substantial installation cost. Also, in practice, the spring biased cam assemblies require repeated adjustment and repair and have proven to have relatively short operating lives. For these reasons, the use of automatic parking meters is becoming rather limited.

Hand-operated meters, on the other hand, generally include a manually turnable handle for selectively setting and winding a clock in accordance with the value of the coin deposited in the meter. Such meters are of a simple design and are relatively inexpensive to manufacture and install. Further, they are relatively trouble-free and possess extremely long operating lives.

Unfortunately, however, commercially available hand-operated parking meters utilize separate, specifically indicated slots for different size coins received by the meter. Also, for each slot, such meters employ separate, yet similar, coin engaging and sensing mechanisms for selectively setting the meter clock upon a turning of the handle. Therefore, even though hand-operated parking meters are of a relatively simple design, they generally include duplicate parts for performing separate yet similar operations for different size coins.

Of more importance to the user of the parking meter, however, is the possible loss of money to the hand-operated meter if he mistakenly deposits a coin in the wrong slot. For example, if the user should deposit a dime in the nickel slot of the meter, the dime is lost to the meter and no amount of turning of the handle will produce a winding of the meter clock.

From the standpoint of the municipality or other owner of the hand-operated meter, meter tampering is a serious problem. Although certain safeguards have been incorporated into commercially available hand-operated parking meters, it is still possible for the unscruplous parker to insert a wire or other foreign object through one of the coin receiving slots, engage the workings of the meter during turning of the handle, and thereby produce a winding of the clock to give free parking time.

A similar problem associated with some commercially available hand-operated meters resides in the fact that the unscrupulous parker can insert a coin into the meter and then turn the handle only part way through its cycle or rotation. This leaves parking time indicated on the meter and the clock stopped.

To combat this problem, other parking meters have included a separate flag, marked "violation" which is exposed during turning of the handle. Unfortunately, however, despite the violation flag, judges have rarely imposed parking fines for such meter violations, since there is still parking time showing on the meter and the parker may have in good faith just failed to turn the handle through its complete cycle of rotation.

Still other meters have rectified this situation by including a mechanism which moves the time indicator to zero during the turning of the handle, in addition to raising a meter violation flag. Therefore, a meter violation shows and no time is indicated on the meter. Although this solves the problem, it unfortunately requires the use of a relatively complex cam and biasing spring arrangement.

A more recent shortcoming found to be common to all commercially available parking meters resides in the fact that no provision is made for the dispensing of redeemable tokens upon the deposit of coins of a particular value into the meter. It is proposed that such tokens be exchangeable for money to pay for parking time while at a particular merchant's shop or store. This, it is hoped, will be added incentive to patronize a particular store or group of stores.

In view of the foregoing, it is an object of the present invention to provide a novel, hand-operated parking meter having a single slot for accepting all size coins and for providing parking time in accordance with the size of coin deposited into the slot.

Another object of the present invention is to provide a hand-operated parking meter having a single coin receiving slot as well as a mechanism for dispensing redeemable tokens in response to the depositing of coins of a particular value into the meter.

A further object of the present invention is to provide a hand-operated parking meter of the foregoing type which is simple in design, long lasting and relatively inexpensive to manufacture.

Sitll another object of the present invention is to provide a hand-operated parking meter, including a meter mechanism which is easy to assemble and disassemble for servicing and replacement of parts.

A still further object of the present invention is to provide a hand-operated parking meter, including an improved and simplified flag system for indicating both the expiration of parking time and a tampering violation of the meter.

It is another object of this invention to provide a hand-operated parking meter, including built in safeguards for preventing the obtaining of free parking time by the insertion of foreign objects through the coin receiving slot of the meter.

The foregoing, as well as other objects and advantages of this invention, may be more clearly understood by reference to the following detailed description when considered with the drawings which, by way of example only, illustrate one embodiment of parking meter including the features of the present invention.

In the drawings:

FIGURE 1 is a perspective view of the parking meter having the upper portion of its housing broken away to expose the meter mechanism and flag system included in the parking meter;

FIGURE 2 is a rear view of the parking meter with a portion of a token dispensing means broken away to illustrate the manner in which the tokens are stationed within the housing;

FIGURE 3 is a top view of the parking meter mechanism illustrated in FIGURE 1;

FIGURE 4 is a sectional side view of the meter along the line 4—4 in FIGURE 1;

FIGURE 5 is a front view of the rear portion of the parking meter mechanism illustrating the flag system for the meter in a "time expired" position;

FIGURE 6 is a view similar to FIGURE 5 with the handle of the meter turned from its normal position to wind the clock of the meter;

FIGURE 7 is a fragmentary top view of the token storage and dispensing apparatus of the parking meter;

FIGURE 8 is a rear view of the front portion of the parking meter illustrating the mechanism for actuating the meter in response to a turning of the handle of the meter;

FIGURE 9 is a fragmentary side view along the arrow in FIGURE 8, showing a door for closing the coin receiving slot of the meter, the door being in a normally open position;

FIGURE 10 is similar to FIGURE 9, illustrating the door in a closed position;

FIGURE 17 is a view similar to FIGURE 8 with the actuating mechanism rotated 90°;

FIGURE 17a is a diagrammatic representation of an arcuate piece for fitting into the track plate of the actuating mechanism of the meter;

FIGURE 17b is a fragmentary view similar to the central portion of FIGURE 17 with a clock winding wheel added to illustrate the concentric nature of the actuating mechanism and winding wheel;

FIGURE 17c is a fragmentary view illustrating a ratchet assembly for the parking meter;

FIGURE 18 is a bottom view taken along the line 18—18 in FIGURE 17, illustrating the coin catching portion of the parking meter;

FIGURE 19 is a view similar to FIGURE 18 with the coin catching mechanism actuated to release a coin into the housing;

FIGURE 20 is a side view of the coin catching mechanism taken along the line 20—20 in FIGURE 17;

FIGURE 21 is a perspective view of the back portion of the meter illustrating the structure of the flag assembly and the token dispensing mechanism.

FIGURE 22 is a fragmentary front view of the rear portion of the parking meter illustrating a modified form of token dispensing assembly for the parking meter;

FIGURE 23 is a side view of the assembly of FIGURE 22; and

FIGURE 24 is a sectional view taken along the line 24—24 in FIGURE 22.

Figure 11:
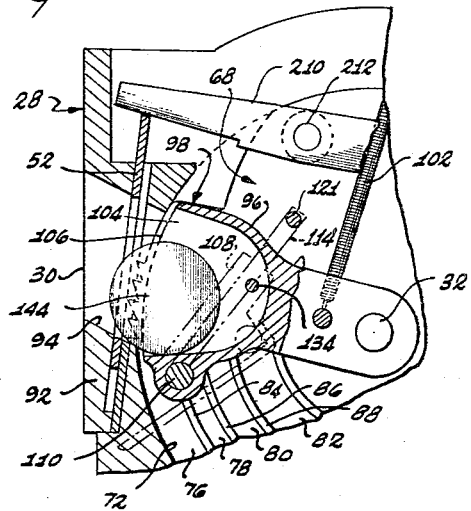
FIGURE 11 is a fragmentary view similar to FIGURE 8 with portions broken away to illustrate the manner in which a coin passes through the coin receiving slot into the actuating mechanism of a meter.
Figure 12:
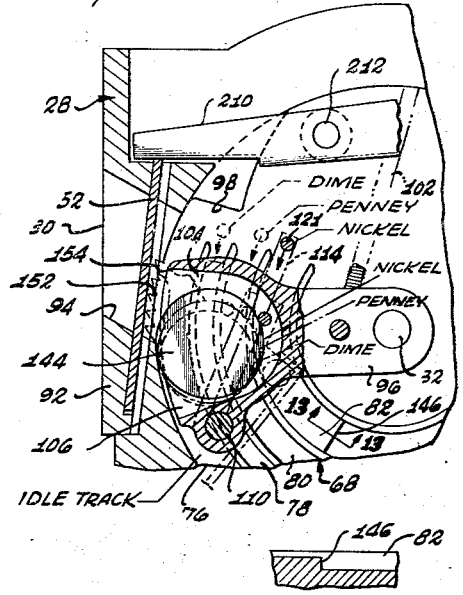
FIGURE 12 is similar to FIGURE 11 with the actuating mechanism rotated from the position illustrated in FIGURE 11 to carry the coin into the meter.

In the drawings, the parking meter is represented generally by the numeral 10 and includes a meter mechanism 12 supported by a surrounding housing 14. Generally speaking, the meter mechanism 12 includes a front plate 16 and a back plate 18, separated by hollow spacers 19 and removably connected together by screws passing through the spacers. The back plate 18 supports a clock 20, clock setting apparatus 22, a parking time indicator 24, and a flag system 26. The front plate, on the other hand, supports a coin receiver 28 having a slot 30 for receiving all size coins, a handle-carrying drive shaft 32, and an actuating mechanism 34 for selectively actuating the clock setting apparatus 22 in accordance with the size coin introduced into the slot 28 and a turning of the drive shaft 32 by a handle 36. The parking meter 10 also includes a token dispensing mechanism 38 having a token storage 40 and a token ejector 42 connected to the back plate 18 and an actuating arm 44 for the ejector carried by the actuating mechanism 34 (see FIGURES 2 and 3).

In brief, when the parking time has expired, the parking meter is in the condition illustrated in FIGURE 1 with a pointer 46 of the time indicator 24 at zero of a time scale 48, and a time expired flag 50 of the flag system 26 raised. To set the parking meter into operation, a coin is inserted through the slot 30 into the actuating mechanism 34. Next, the handle 36 is turned. This causes a door 52 (see FIGURES 9 and 10) to immediately close the slot 30. If the door is blocked from closing by a foreign object in the slot 30, the handle 36 is prevented from turning to set the clock, thereby preventing the obtaining of free parking time.

In addition to closing the door 52, the initial turning of the handle 36 lowers the time expired flag 50 and raises a violation shutter combination 54 to cover the entire area under the scale, including the pointer 46. Thus, in case of a meter violation by a partial turning and locking of the handle, the entire viewing area below the scale is covered by the violation shutter and no parking time is visible on the meter. The shutter remains exposed to indicate a meter violation until the entire cycle of rotation of the handle is completed.

If a coin has been deposited in the meter, the initial turning of the handle 36 also energizes the actuating mechanism 34 to sense the size or value of the coin. Thereafter, a turning of the handle 36 causes the actuating mechanism 34 to carry the coin, which eventually passes into the housing, and to selectively actuate the clock setting apparatus 22 to set the clock 20 to operate for a period of time determined by the size of the coin. The setting of the clock moves the pointer 46 along the scale 48 to a corresponding time indicating position. Therefore, with a lowering of the shutter 54, the pointer 46 provides a visual indication of the operating time remaining for the clock 20.

Additional coins may then be added to the parking meter 10 and the foregoing operation repeated until the maximum operating time of the clock is reached. If any one of the coins is of a predetermined size, then the turning of the handle carries the actuating arm 44 into engagement with the token ejector 42 to dispense a redeemable token from the parking meter. This token may be utilized to obtain a cash refund to pay for the parking time while at a particular merchant's shop.

As the clock operates, the pointer 46 is moved back toward the zero indication on the scale and upon a termination of the clock operation, the time expired flag 50 is again raised.

Referring more particularly to FIGURES, 3, 4, 5 and 6, the clock 20 is carried by the back of the back plate 18 and is of a conventional windable type having a shaft 56 extending forward therefrom through and substantially normal to the back plate 18. The clock 20 is adapted to operate for predetermined periods of time, depending upon the amount of clockwise rotation imparted to the shaft 56. Here, for example, the clock 20 is adapted to operate for two hours in response to a turning of the shaft 56 through approximately 180° and to operate for increments of two hours in accordance with corresponding increments of turning of the shaft 56. The clock 20 is also adapted to rotate the shaft 56 in a counterclockwise direction as the clock operates and unwinds. As the shaft 56 turns in a counterclockwise direction with the unwinding of the clock 20, an arm 58 connected to the shaft comes into engagement with a pin 60 extending from the back plate 18 to prevent further counterclockwise movement of the shaft and to define a zero time condition for the clock. Thus, a turning of the shaft 56 to wind the clock 20 is with respect to the zero time position defined by the arm 58 and pin 60.

To provide means for selectively setting the clock 20 to operate for predetermined periods of time, the clock setting apparatus 22 includes a clock winding wheel 62 fixed to the forward end of the shaft 56 by a nut 63, and to the arm 58 by a pin 64 passing through a hole 65 in the wheel. The winding wheel 62 carries a series of teeth 66 extending radially from the shaft 56. The teeth are equally spaced from each other and occupy equal arcs along the winding wheel corresponding to equal increments of time. In particular, a turning of the winding wheel 62 through an arc corresponding to one tooth 66 rotates the shaft 56 to wind the clock to operate for 12 minutes. The turning of the wheel through an arc equal to two of the teeth 66 winds the clock to operate for 24 minutes and so on up to a maximum of two hours.

The actuating mechanism 34 is adapted to selectively engage particularly ones of the teeth 66 and to wind the clock 20 to operate for periods of time in accordance with the size or value of the coin deposited in the meter. The actuating mechanism 34 is most clearly illustrated in FIGURES 3, 8 and 11–17 and as represented includes the drive shaft 32, a circular track carrying plate 68, a coin carrier 96, a pawl carrier 108, and a winding pawl 114. In brief, a turning of the drive shaft 32 causes the winding pawl 114 to follow a particular track on the plate 68, determined by the size coin in the coin carrier 96. At a predetermined point along the track, depending upon the parking time to be provided by the coin, the pawl is moved into engagement with a tooth 66 such that further turning of the drive shaft 32 turns the winding wheel 62 to produce a predetermined winding of the clock 20. By this arrangement, a dime may be programmed to give two hours parking time, a nickel one hour, and a penny twelve minutes. Provision also may be made for a quarter and a fifty-cent piece. Here, however, for simplicity of description, meter operation is limited to two hours maximum and the actuating coins to pennies, nickels and dimes.

More particularly with actuating mechanism 34, the track carrying plate 68 covers a circular opening 70 in the front plate 16 and provides bearing support for the drive shaft 32 through a sleeve 74 extending forward from the front of the plate 68 coaxial with the clock shaft 56. The plate 68 also carries a plurality of arcuate tracks 76–82 concentric with the drive shaft 32. The tracks are of different radial dimensions and, as illustrated, are defined by an arcuate shoulder 72 around the plate 68 defined by the opening 70, and by a series of arcuate ridges 84–88 extending from the rear face of the plate 68 concentric with the drive shaft. The track 76 is an idle track while the tracks 78, 80 and 82 are clock winding tracks and correspond to different size coins, namely, a dime, penny, and nickel. The tracks occupy slightly more than 180° of the plate 68 and extend from the coin receiver 28, here comprising a vertical block 92 with a coin chute 94 leading from the slot 30 radially inward toward the actuating mechanism 34.

The coin-carrying member 96 of the actuating mechanism 34 is aligned with the shoulder 72 and is fixedly connected to the drive shaft 32 for swinging movement over and parallel to the track carrying plate 68 between first and second stop positions. The first stop position is defined by a shoulder 98 adjacent the coin receiving slot 30 (see FIGURES 8 and 11) and the second stop position by a shoulder 100 (see FIGURE 17). The coin carrier 96 is continuously urged to the first stop position by a coil spring 102 connected to the top of the front plate 16 and to the coin carrier. In the first stop position, the coin carrier is radially aligned with the coin chute 94 and is adapted to receive coins of all sizes in a hollow outer end portion 104 through a slot 106 (see FIGURE 11). With a turning of the drive shaft toward the second stop position, the coil spring 102 winds around the drive shaft and the coin carrier carries the coin along the shoulder 72 and eventually drops the coin into the housing of the meter.

Figures 13, 14:
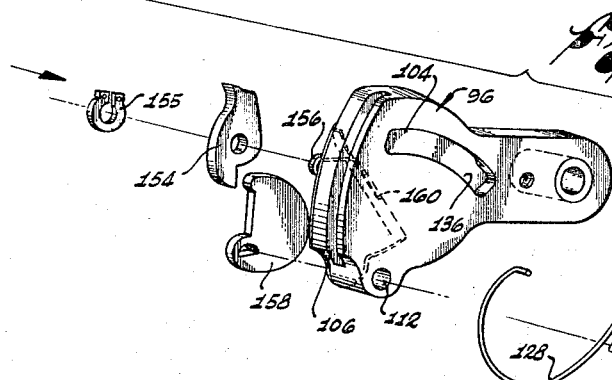
FIGURE 13 is a sectional view along the line 13—13 in FIGURE 12.
FIGURE 14 is an exploded perspective view of the actuating mechanism of the meter.
Figure 16:
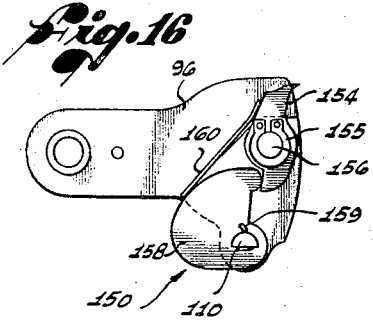
FIGURE 16 is an end view of the meter actuating mechanism looking along the direction of the arrow in FIGURE 14.
Figure 15:
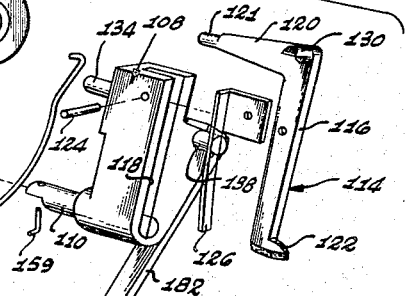
FIGURE 15 is a diagrammatic representation of the movement of a winding arm of the actuating mechanism with rotation of the handle of the meter.

As illustrated most clearly in FIGURES 8, 14 and 17, the elongated pawl carrier 108 is pivotally connected to the coin carrier 96 for swinging movement about an axis parallel to the drive shaft 32. To this end, the pawl carrier 108 includes a shaft 110 extending normal thereto and through a hole 112 in a lower portion of the coin carrier 96. The pawl carrier is thus free to swing about the shaft 110 and carry the pawl 114 over the back surface of the coin carrier 96.

The pawl 114 is generally L-shaped, having a relatively long leg 116 stationed within a slot 118 extending longitudinally along the pawl carrier from the rear end of the shaft 110, and a relatively short leg 120 normal to the leg 116 and extending over an upper edge of the coin carrier 96 toward the track carrying plate 68. A pin 124 extends laterally through the pawl carrier 108, the slot 118 and through the leg 116 to pivotally support the pawl for swinging movement about an axis generally normal to the drive shaft 32 thereby carrying the tip 121 of the leg 120 toward and away from the tracks of the track carrying plate 68. In this regard, a spring member 126 normally urges the tip 121 toward the track plate to engage and follow particular ones of the plurality of tracks with swinging movement of the coin carrier 96.

The particular track followed by the tip 121 with a turning of the drive shaft 32 is determined by the angular position of the pawl carrier 108 relative to the coin carrier 96. Normally, the pawl carrier 108 is urged, by a spring wire 128, to rotate about the shaft 110 and carry the tip 121 toward the idle track 76. Therefore, a turning of the drive shaft 32 by the handle 36 normally carries the tip 121 along the idle track 76. When a coin is inserted into the hollow end of the coin carrier 96, however, the pawl carrier assumes a different angular position relative to the coin carrier and the tip 121 follows one of the clock winding tracks upon a subsequent turning of the drive shaft 32—the particular track being determined by the size of the coin. In this regard, a pin 134 extends from the front of the pawl carrier 108 and rides in an arcuate slot 136 in the coin carrier 96 open to the hollow 104. Since the pawl carrier 108 is normally urged to swing toward the idle track, the pin 134 is normally urged to engage the coin in the coin carrier and thereby control the angular relationship between the pawl and coin carriers, and hence the particular track followed by the tip 121.

Since the force of the pin 134 would act to impede the insertion of a coin into the coin carrier, however, the pin 134 is held away from the end slot 106 of the coin carrier when the coin carrier is in and adjacent its first stop position. This is accomplished by a cam plate 140 connected to the rear face of the coin receiver 28 and extending over the hollow end of the coin carrier 96 (see FIGURE 8). A pin 138 extending rearward from the back edge of the pawl carrier 108 engages the curved cam surface 142 of the plate 140 to rotate the pawl leg 120 away from the idle track as the coin carrier returns to or is in its first stop position. This moves the pin 134 away from the end slot 106 of the coin carrier 96 to allow free passage of a coin, such as 144 in FIGURES 11 and 12, into the coin carrier.

Therefore, in operation, a turning of the drive shaft 32 rotates the coin carrier 96 in a clockwise direction to carry the coin 144 downward into the mechanism 34— the edge of the coin riding over the arcuate shoulder 72. As the coin carrier 96 initially swings about the drive shaft 32, the pin 138 follows the cam surface 142 causing the pawl carrier 108 to swing slowly toward the idle track. As this occurs, the pin 134 engages the edge of the coin 144 to define the angular position of the pawl carrier 108 relative to the coin carrier 96 for the remaining movement of the coin carrier with the drive shaft. As the coin carrier continues to turn with the drive shaft, the tip 121 follows an appropriate clock winding track on the plate 68.

Here, the coin 144 is illustrated as being a nickel. Therefore, the tip 121 passes into and travels along the track 82 with a turning of the drive shaft 32. As the tip 121 travels along the track 82 and at a predetermined rotational position for the coin carrier 96, the tip reaches a drop off point in the track 82 defined by a step 146. Under the urging of the spring 126, the tip 121 continues to press against the bottom of the track 82. Therefore, upon reaching the step 146 (see FIGURE 15), the pawl 114 rotates about the pin 124 in the manner represented diagrammatically in FIGURE 15.

As illustrated, the rotation of the pawl 114 causes a pick 122 on the end of the pawl over the center of the shaft 110 to move toward the winding wheel 62 between particular ones of the teeth 66. It should be noted in this regard, that since the pick 122 lies over the end of the shaft 110, it, like the shaft 110, continuously follows the teeth 66 with a turning of the coin carrier 96 (see FIGURE 17b). Therefore, regardless of the angular position assumed by the pawl carrier 108 relative to the coin carrier 96, the pick 122 of the pawl 114 always engages the teeth 66 with movement toward the winding wheel 62 and rotation of the pawl with the coin carrier.

After the pick 122 engages a tooth 66 of the winding wheel 62, further turning of the drive shaft 32 produces a similar turning of the winding wheel and hence a winding of the clock 20. In the nickel track 82, the drop off point for the pawl 114 is programmed such that a subsequent turning of the drive shaft turns the winding wheel through an arc corresponding to five of the teeth 66 to thereby wind the clock 20 to operate for one hour. The drop off point for each of the other clock winding tracks is accordingly programmed such that when the pawl tip 121 follows the dime track, the movement of the pick 122 and subsequent turning of the drive shaft produces a rotation of the winding wheel 62 through an arc corresponding to ten teeth to set the clock to operate for two hours. Similarly, the drop off point in the penny track 80 is programmed to produce a turning of the winding wheel through an arc corresponding to one tooth to wind the clock for twelve minutes.

It should be noted, however, that the particular winding time provided by the actuating mechanism 34 can be selectively programmed and the programming can be changed by the insertion of arcuate strips such as 147 shown in FIGURE 17a into the various clock winding tracks to provide selective winding of the clock for any desired length of time in response to insertion of a penny, nickel or dime. For example, the meter may be programmed to provide two hours parking time for a nickel or to provide twelve minutes parking time for a nickel, as desired by the owner of the parking meter.

Independent of the size coin introduced into the parking meter, the coin carrier 96 assumes the previously defined second stop position at the end of its cycle of rotation. In this position the tip 121 leaves the winding track and under the force of the spring wire 128 moves radially toward the idle track 76. This movement is depicted by the broken arrow line in FIGURE 17. A release of the handle 36 allows the coil spring 102 to return the coin carrier to its first stop position with the tip 121 following the idle track 76. In this regard, as the tip 121 enters the idle track 76, a pin 130 extending from the pawl 114 engages an inclined stop member 132 extending from the back of the front plate. Movement of the pin 130 over the stop 132 pivots the pawl 114 to move the pick 122 out of engagement with the wheel 62 freeing the pawl carrier and coin carrier to return to the first stop position. The stop 132 also limits rotation of the coin carrier 96 when the tip is riding in the idle track.

As the coin carrier 96 again approaches the first stop position, the pick 122 passes under the cam plate 140 and engages its lower surface to rotate the pawl 114 and raise the tip 121 from the track carrying plate 68. Therefore, during the last portion of the return of the coin carrier to the first stop position, the tip 121 effectively floats over the plate 68. This reduces friction wear on the tip as well as on the plate and insures that the tip does not accidentally enter one or the other tracks upon a reverse turning of the handle 34 at the end of a clock winding cycle.

During the actual winding operation of the clock 20, the actuating mechanism 34 is prevented from reversing its rotational direction prior to reaching the second stop position. This prevents the obtaining of free parking time by cranking of the handle 36 and is accomplished by a ratchet assembly 150 (see FIGURES 8, 14, 16 and 17c). The ratchet assembly 150 includes an arcuate ratch 152 formed in the exterior of the opening 70 between the shoulder 72 and the back of the track carrying plate 68. The ratch begins midway along the coin receiving chute 94 and extends approximately 270° around the track carrying plate 68. In addition to the ratch 152, the ratchet assembly includes a pawl 154 and a pawl cam 158. The pawl 154 is connected to turn about a shaft 156 extending forward from the coin carrier 96 and is secured thereto by a snap ring 155. The pawl cam 158 is connected to the end of the shaft 110 of the pawl carrier and turns therewith—the semicircular end of the shaft 110 fitting into a similar semicircular hole in the pawl cam 158 and the cam secured in place by a key 159 passing through the end of the shaft.

Basically, the ratchet assembly 150 is designed such that the pawl 154 engages the ratch 152 whenever the tip 121 of the pawl 114 is riding in a clock winding track. To this end, and as most clearly illustrated in FIGURE 16, the pawl cam 158 normally engages the pawl 154 which in turn is urged against the cam by a flat spring 160. As the pawl carrier 108 turns toward the idle track 76, the cam 158 rotates with the shaft 110 to retract the pawl 154 against the force of the spring 160. When the tip of the pawl arm 120 is in the idle track, the pawl 154 is completely retracted and does not engage the ratch 152 with a turning of the coin carrier. However, when the tip 121 rides in any of the winding tracks, the pawl 154 engages the ratch 152 to prevent a reversal of the drive shaft 32 once the winding operation has begun. When the coin carrier reaches a second stop position, the pawl cam 158 engages a pin 162 extending from the plate 68 to produce a rotation of the cam 158 as well as the shaft 110 causing the tip 121 to move toward the idle track. As this occurs, the pawl cam 158 retracts the pawl 154 from the ratch, and allows the coin carrier 96 to freely turn under the force of the spring 102 to the first stop position.

As previously indicated, the turning of the coin carrier 96 carries with it the coin 144, which is eventually dropped into the housing 12. In this regard, during the turning of the coin carrier 96 and after the tip 121 has engaged the appropriate winding track, the coin 144 is deposited into a coin catcher 162. The coin catcher 162 is most clearly illustrated in FIGURES 17, 18, 19 and 20. As represented, the coin catcher 162 includes a generally vertical back plate 164 having an arc-shaped upper lip 166 and a pair of bottom flaps 168 normally engaging the back of the front plate 16 under a vertical slot 170 extending downward from the arcuate shoulder 72. The plate 164 is pivotally connected at the back of the front plate 16 by a shaft 172 passing through aligned openings in a pair of support flanges 174 extending from the front plate and a pair of connecting flanges 176 extending forward from opposite sides of a backing plate 164. A bent wire spring 178 passes around the ends of the shaft 172 and presses both against the back of the front plate 16 and the back of the plate 164 under the shaft 172. In this manner, the spring 178 normally urges the flaps 168 against the front plate 16 to catch coins passing through the vertical slot 170 when the coin carrier 96 is aligned therewith.

The portion of the front plate 16 immediately in front of the lower portion of the backing plate 164 is open and supports a viewing lens 180 for providing a slightly magnified projection of the coin held by the coin catcher 162. This provides the public with a clear view of the coin last inserted into the parking meter. Traffic officers patrolling the parking meters are then able to detect slugs which may have been inserted into the meter to provide free parking time.

The operation of the coin catcher 162 to selectively drop coins into the housing of the parking meter is under the control of an actuating arm 182 connected to the pawl carrier 108 and extending longitudinally therefrom beyond the outer edge of the coin carrier. The actuating arm 182 thus turns with the pawl carrier and is raised and lowered relative to the coin catcher with a turning of the pawl carrier 108 about the shaft 110. In particular, the actuating arm 182 is dimensioned such that when the tip 121 of the pawl 114 is riding in the idle track, the end of the actuating arm rides over the top of the lip 166 and does not engage the coin catcher. However, when the tip 121 is riding in any of the clock winding tracks, the end of the actuating arm 182 is radially extended to engage a side of the lip 166 to pivot the backing plate 164 about the shaft 172 and move the flaps 168 away from the vertical slot 170 thereby allowing the coin to drop into the housing. Since the actuating arm 182 is carried by a forward edge of the pawl carrier 108, relative to the coin carrier 96, the coin catcher 162 is selectively operated to open and close prior to alignment of the coin carrier with the vertical slot 170. Thus, the coin held by the coin catcher 162 is deposited into the meter housing prior to the dropping of a new coin into the coin catcher. In this manner, the coin catcher 162 holds and exposes each coin as it is deposited into the parking meter to provide parking time, and upon the insertion of a new coin drops the old coin into the meter and exposes the new coin.

As previously indicated, one of the major features of the present parking meter is its ability to selectively dispense redeemable tokens upon the insertion of coins of a predetermined value into the single coin receiving slot of the meter. The token dispenser is most clearly illustrated in FIGURES 2, 3, 4, 5, 7 and 21, and as previously indicated, includes the cylindrical token holder 40, the token ejecting arm 42 and the actuating arm 44 carried by the actuating mechanism 34. The token holder is connected to the back of the back plate 18 by a supporting bracket 183 and houses therein a plurality of redeemable tokens 184 stacked one atop each other. The top of the cylindrical holder 40 is covered by a removable plug 186 and has a horizontal token ejecting slot 188 in its lower end opposite an inverted T-shaped finger receiving slot 190. The token ejecting arm 42 is pivotally connected to the back plate 18 by a vertically extending shaft 192 passing through aligned vertical openings in a pair of support flanges 194 extending frontward from the back plate 18 and a pair of coupling flanges 196 extending from the token ejecting arm 42. The arm 42 is normally urged away from the token holder 40 by the spring 198 and is swung toward the token holder to pass a T-shaped finger 200 through the slot 190 in response to the actuating arm 44 engaging a cam surface 202 extending from the arm 42. The actuating arm 44 is connected to and extends rearward from the coin catcher actuating arm 182. Therefore, as with the actuating arm 182, the arm 44 assumes a raised or lowered position relative to the cam 202 depending upon the angular position of the pawl carrier 108 relative to the coin carrier 96. Here, the arm 44 is designed to engage the cam surface 202 when the tip 121 of the pawl 114 is riding in the dime track and to miss the cam 202 when the tip 121 is riding in any other track. Thus, when the tip 121 rides in the idle track, the arm 44 passes over the top of the cam 202 with a turning of the coin carrier. However, for the penny or nickel, the arm 44 passes under the cam surface 202. It should be appreciated that by selectively designing the position of the arm 44, a token can be dispensed for any desired coin—not just the dime.

When the arm 44 engages the cam surface 202, it forces the ejecting arm 42 backward to push the finger 200 through the T-shaped slot 190. This in turn, ejects the bottom token from the token holder through the forward slot 188 while lifting the token immediately above the bottom token to insure that the tokens do not become jammed during ejection from the token holder.

An alternate form of token dispenser is illustrated in FIGURES 22, 23 and 24. In many respects it resembles the token dispenser 38 and is therefore represented generally by the numeral 38' with elements corresponding to parts of the dispenser 38 being represented by like numerals with a prime (') notation. In particular, the dispenser 38' includes a token holder 40' and a token ejecting arm 42' pivotally connected to the back plate 18' in the same manner as the arm 42' The arm 42' also includes an inverted T-shaped finger 200' for passing into a similar slot 190' in the holder 40' to eject a token through a back slot 188'. The arm 42' differs from the arm 42, however, in that the cam surface 202 is replaced by a cam surface 260 comprising a vertical ridge 262 inclined away from the back plate 18 from right to left.

The means for actuating the arm to eject a token from the holder 40' also differs from that in the dispenser 38. In particular, the actuating means takes the form of teeth 264 and 266 carried by the winding wheel 22. The teeth 264 and 266 are bent rearward from the plane of the wheel 22 and then radially outward from the center of the wheel in a plane including the ridge 262. Further, the teeth 264 and 266 are spaced relative to each other and to the teeth 66 so as to engage the front side of the ridge 262 when the clock 20 is wound to operate for one hour and two hours, respectively. This means that whenever the clock is wound to operate for one hour, the tooth 264 will engage the ridge 262 and move the arm 42' to eject a redeemable token from the holder 40. This occurs whether the winding was in response to the insertion of a nickel or five pennies into the meter. Likewise, when a dime or the equivalent amount of money in nickels and/or pennies is inserted into the meter, first the tooth 264 and then the tooth 266 engage the ridge 262 to separately dispense two tokens for two hours parking time.

As the clock 20 unwinds, the teeth 264 and 266 turn with the wheel 22 in a counterclockwise direction and engage the rear side of the ridge 262. When this occurs, the pivotal coupling of the arm 42' is flexible enough to allow the arm to move slightly away from the back plate 18 and permit the passage of the teeth over the ridge 262 without slowing the time operation of the clock 20.

An additional feature of the parking meter is its ability to prevent the obtaining of free parking time by the insertion of wire or other foreign objects through the coin receiving slot 30. This is accomplished by the door 52, most clearly illustrated in FIGURES 9, 10, 11, 12 and 17. As represented in FIGURES 9 and 10, the door 52 is supported for sliding movement within a slot 204 in the coin receiver 28 transverse to the coin receiving slot 30. The door 52 includes a slot 206, similar to the coin receiving slot 30. A coil spring 208 stationed within the coin receivers 28 and pressing upward upon the bottom of the door 52 normally maintains the slot 206 aligned with the slot 30.

As previously indicated, the door 52 is adapted to immediately close upon a turning of the drive shaft 32 and if blocked from closing by any sort of foreign object in the slot 30 prevents further turning of the drive shaft or the setting of the clock. The means for actuating the door in this manner includes an arm 210 pivoted about a pin 212 extending from the front plate 16 parallel to the drive shaft 32. One end of the arm 210 passes through a vertical slot 214 in the coin receiver 28 to engage the top of the door 52. The other end of the arm 210 carries a pin 216. When the coin carrier 96 is in its first stop position, the pin 216 engages and rests upon the radial cam surface 217 of a cam disk 218 connected to the coin carrier 96 for rotation about the drive shaft 32. With a turning of the drive shaft 32, the pin 216 rides up on the radial cam surface 217 to pivot the arm 210 about the pin 212 forcing the door 52 downward within the transverse slot 204. This compresses the spring 208 and closes the door by carrying the slot 206 out of alignment with the coin receiving slot 30. When the door is completely closed, the pin 216 engages a circular cam surface 219 of the disk 218 which maintains the door closed during the entire rotational cycle of the coin carrier. Because of the positive engagement between the cam surface and the pin 216, it is impossible for a foreign object to wedge the door open once it has been closed during the rotational cycle of the coin carrier. By the same token, if a foreign object is placed in the open door and blocks the door from closing, it also blocks the disk 218 from turning and halts rotation of the shaft 32, thereby preventing the setting of the clock 20.

The door closing arm 210 also acts as an actuating arm for the flag system 26. As previously indicated, the flag system includes a time expired flag 50 and a meter violation shutter combination 54. The arrangement of the flag system 26, together with the pointer 46 of the time indicator 24, is most clearly illustrated in FIGURE 21. As represented, both the time expired flag 50 and the violation shutter combination 54 are pivotally connected to the back plate 18 by pins 220 and 222, respectively. The shutter combination 54 includes a pair of spaced shutters marked "violation" extending on opposite sides of the pointer 46 and connected together at opposite ends. The left end of the shutter combination is connected to a sleeve 224 extending around the pin 222 and carrying an arm 226. A pin 228 extending from the arm 226 engages the end of the door actuating arm 210 just beyond the pin 216. The weight of the shutters rotates the shutter combination 54 in a clockwise direction about the pin 222 to normally maintain the shutter combination in the retracted position as represented in FIGURE 5.

The time expired flag 50, on the other hand, is normally urged toward an exposed position illustrated in FIGURE 6. To this end, a spring wire 230 passes over a pin 232 and around the flag supporting pin 220 and loops under the time expired flag. In this position, a flange 234 carried by a tail 236 of the time expired flag 50 engages a pin 238 carried by a tail 240 of the violation shutter combination.

In operation then, a turning of the drive shaft 32 rotates the cam disk 218 to cause the actuating arm 210 to turn about the pin 212 and engage and raise the pin 228 of the violation shutter combination 54. This raises the violation shutter to cover the entire area below the scale 48 including the pointer 46. Also the movement of the violation shutters causes the pin 238 to press against the flange 234 and rotate the time expired flag 50 to a retracted position below the violation shutters. In this manner, whenever the handle 36 is turned, the violation shutters cover the pointer 46 to effectively clear the meter of any time indication and to provide an indication of a meter violation. If the handle is partially turned and then jammed by a foreign object or if a coin has been inserted and the handle only turned part way, the violation sign remains raised to indicate a meter tampering violation. However, if the cycle of rotation of the handle is completed, the cam disk 218 returns to its normal position and the actuating arm 210 lowers to retract the violation shutter combination 54.

If no coin has been inserted into the meter, the time expired flag again raises. However, if a coin has been inserted into the meter and the clock wound for a predetermined period of time, the pointer 46 moves to an appropriate position over the scale 48 to indicate the operating time remaining for the clock 20. This is accomplished by a cam 242 connected to the clock shaft 56 for rotation therewith. The cam 242 normally engages a pin 244 carried by a tail 246 of the pointer 46. The pointer 46 is normally supported for rotation about a pin 248 extending from the back plate 18 parallel to the clock shaft 56 and the tail 246 is normally urged in a clockwise direction by a spring 250 to cause the pin 244 to continuously engage the cam 242. Thus, as the clock shaft 56 is rotated by the winding wheel 22, the pin 244 continues to follow the cam 242. Under the influence of the spring 250 the pointer 46 is then moved along the scale 48 to indicate the appropriate operating time remaining for the clock.

As previously indicated, if a coin has been deposited into the meter, a turning of the handle causes the pointer 46 to move over the scale. This occurs while the time expired flag is in its retracted position, as represented in FIGURE 21. As the pointer 46 moves over the scale, a pin 252 on the time expired flag 50 passes into an arcuate slot 254 in the pointer 46. When the violation shutter combination is lowered, the spring 230 raises the pin 252 to engage the upper surface of the arcuate slot 254. This holds the time expired flag 50 in its retracted position until the pointer 46 travels to a zero indication over the scale 48. At this time, the pin 252 leaves the slot 254 and the spring raises the time expired flag to indicate that the operating time for the clock has elapsed.

By way of summary then, to operate the parking meter 10, the parker inserts an appropriate coin into the coin receiving slot 30 depending upon the amount of parking time desired. The coin passes through the slot down the coin chute 94 and into the hollow outer end of the coin carrier 96. The parker then grasps the handle 36 and turns the handle in a clockwise direction. The initial turning of the handle lowers the time expired flag 50 and raises the violation shutter combination 54 over the pointer 46 and closes the door 52. Further turning of the handle carries the coin engaging pin 138 of the pawl carrier 108 against the coin in the coin carrier 96 to determine the relative angular position between the pawl carrier 108 and the coin carrier and to select appropriate track for the tip 121 of the pawl 114. The tip 121 then follows the appropriate track and upon reaching the step 146 drops to a lower level of the track and raises the pick 122 to engage the appropriate tooth of the wheel 22. During the turning of the coin carrier 96, the coin drops into the coin catcher 162 for viewing through the lens 180. Subsequent turning of the handle causes the winding wheel to turn under the force of the pawl until the coin carrier reaches its second stop position. The tip 121 then leaves the track and the influence of the spring wire 128 causes the pawl carrier 108 to return the tip to the idle track. The passage of the pin 130 of the pawl over the raised stop 132 lifts the tip 121 onto the idle track and moves the pick 122 out of engagement with the winding wheel 22. The spring 102 then returns the coin carrier 96 to its first stop position.

Upon reaching the first stop position, the violation shutter 54 drops to its retracted position to expose the pointer 46 over the appropriate time indication on the scale 48. The pointer 46 also holds the time expired flag 50 in a retracted position and turns with the clock shaft 56 as the clock unwinds. When the clock is completely unwound and is in its normal position, the time expired flag 50 is again exposed to indicate that the parking time provided by the meter has expired.

If the coin inserted into the parking meter is a dime, the rotation of the pawl carrier 108 in response to a turning of the handle 36 actuates the token dispensing assembly 38 to selectively eject a redeemable token from the meter. This token may be utilized to obtain a cash refund to pay for the parking time while at a particular merchant's store or shop.

In view of the foregoing, it is appreciated that the present invention provides an improved hand operated parking meter having a single slot for accepting all sized coins.

The meter also provides means for selectively dispensing redeemable tokens when coins of a predetermined size or value are inserted into the meter. Further, the mechanism of the parking meter is supported on front and back plates to provide a two-piece construction which is easily separated for servicing and replacement of component parts. In practice, however, the meter has proven to be very long lasting, durable and reliable in its operation and to require a minimum of servicing. Moreover, the simple design of the parking meter, with the inclusion of a single actuating mechanism for all size coins, substantially reduces the manufacturing costs of the meter to a minimum.

Moreover, the flag system of the present invention is much simplified over that employed in other hand-operated parking meters providing an indication of the meter tampering violation.

Furthermore, the automatically closing door 52 provides a built-in safety feature which overcomes serious limitations of commercially available hand-operated parking meters.

In the foregoing, a particular form of parking meter has been described in some detail. It is, of course, appreciated that changes and modifications may be made in the illustrated form without departing from the spirit of the present invention. It is therefore intended that this invention be limited in scope only by the terms of the following claims.

I claim:
1. A parking meter, comprising:
a meter mechanism including
   a clock,
   clock setting means for selectively setting said clock to operate for different periods of time,
   coin receiving means having an opening for receiving coins of different sizes,
   coin gauging means for sensing the size of the coins received by said coin receiving means,
   and actuating means for selectively actuating said clock setting means in accordance with the size coin sensed by said coin gauging means;
a housing supporting said mechanism;
token storage means in said housing;
and means connected to said actuating means of said mechanism for selectively and automatically dispensing a token from said storage means only when the coin sensed by said gauging means is of a predetermined size.

2. A parking meter, comprising:
a meter mechanism including
   a clock,
   a drive shaft,
   means defining a plurality of separate arcuate tracks,
   a coin carrier connected to said drive shaft for swinging movement over said tracks in response to a turning of said drive shaft,
   a pawl carrier pivotally connected to said coin carrier,
   a pawl carried by said pawl carrier for following different ones of said tracks with turning of said drive shaft, the particular track followed being controlled by the angular position of said pawl carrier relative to said coin carrier during turning of said drive shaft,
   means for pivoting said pawl carrier into contact with a coin in said coin carrier to determine the angular position of said pawl carrier relative to said coin carrier and the particular track followed by said pawl with a turning of said drive shaft,
   and means for selectively setting said clock to operate for different periods of time in accordance with the particular track followed by said pawl;
and a housing supporting said mechanism.

3. A parking meter, comprising:
a meter mechanism including
   a clock,
   a drive shaft,
   means defining a plurality of separate sustantially coplanar arcuate tracks,
   a coin carrier connected to said drive shaft for swinging movement over and substantially parallel to said tracks in response to a turning of said drive shaft,
   a pawl carrier pivotally connected to said coin carrier for swinging movement about an axis substantially normal to said tracks,
   coin engaging means carried by said pawl carrier,
   a pawl carried by said pawl carrier for following different ones of said tracks with turning of said drive shaft, the particular track followed being controlled by the angular position of said pawl carrier relative to said coin carrier during turning of said drive shaft,
   means for pivoting said pawl carrier to swing said coin engaging means into contact with a coin in said coin carrier to determine the angular position of said pawl carrier relative to said coin carried and the particular track followed by said pawl with a turning of said drive shaft,
   and means for selectively setting said clock to operate for different periods of time in accordance with the particular track followed by said pawl;
and a housing supporting said mechanism.

4. A parking meter, comprising:
a clock;
a drive shaft;
means defining a plurality of separate arcuate tracks;
a coin carrier connected to said drive shaft for swinging movement over said tracks in response to a turning of said drive shaft, said coin carrier including a coin receiving slot;
means continuously urging said coin carrier to a stop position for receiving coins through said coin receiving slot;
a pawl carrier pivotally connected to said coin carrier;
a pawl carried by said pawl carrier for following different ones of said tracks with turning of said drive shaft, the particular track followed being controlled by the angular position of said pawl carrier relative to the coin carrier during turning of said drive shaft;
means for pivoting said pawl carrier into contact with a coin in said coin receiving slot to determine the angular position of said pawl carrier relative to said coin carrier and the particular track followed by said pawl with a turning of said drive shaft;
means for selectively setting said clock to operate for different periods of time in accordance with the particular track followed by said pawl;
a normally open sliding door for closing to block said coin receiving slot;
and means for immediately closing said door to block said coin receiving slot with movement of said coin carrier from said stop position and for halting turning movement of said drive shaft to prevent the setting of said clock if said door is held open by a foreign object, said means including an arm adapted to pivot about an axis substantially normally to said drive shaft with an end engaging and moving said door over said coin receiving slot and a cam connected to said drive shaft and having a radial surface engaging an opposite end of said arm to pivot said arm with a turning movement of said drive shaft and an arcuate surface continuous with said radial surface for receiving said opposite end of said arm after leaving said radial surface.

5. A parking meter, comprising:

a clock;

a drive shaft;

means defining a plurality of arcuate tracks of different radial dimension concentric with said drive shaft, one of said tracks being an idle track and the other of said tracks being clock setting tracks;

a coin carrier connected to said drive shaft for swinging movement over said tracks in response to a turning of said drive shaft;

a pawl carrier pivotally connected to said coin carrier for swinging movement about an axis substantially parallel to said drive shaft;

coin engaging means carried by said pawl carrier;

a pawl carried by said pawl carrier for following different ones of said tracks depending upon the angular position of said pawl carrier relative to said coin carrier during a turning of said drive shaft;

means continuously urging said pawl carrier to swing said pawl toward said idle track and said coin engaging means against a coin in said coin carrier, the size coin determining the angular position of said pawl carrier relative to said coin carrier and the particular clock setting track followed by said pawl with turning movement of said drive shaft;

and means for selectively setting said clock to operate for predetermined periods of time in accordance with the particular track selected by said pawl and the travel of said pawl within said particular track.

6. A parking meter, comprising:

a clock;

a drive shaft;

a track carrying plate substantially normal to said drive shaft and including a plurality of arcuate tracks of different radial dimension concentric with said drive shaft, one of said tracks being an idle track and the other of said tracks being clock setting tracks;

a coin carrier connected to said drive shaft for swinging movement over said tracks in response to a turning of said drive shaft, said coin carrier including a coin receiving slot;

a pawl carrier pivotally connected to said coin carrier for swinging movement about an axis substantially parallel to said drive shaft;

coin engaging means carried by said pawl carrier;

a pawl pivotally connected to said pawl carrier on an axis substantially normal to said drive shaft for following different ones of said tracks depending upon the angular position of said pawl carrier relative to said coin carrier during turning of said drive shaft;

means urging a tip of said pawl to engage said track carrying plate;

means continuously urging said pawl carrier to swing said pawl tip toward said idle track and said coin engaging means against a coin in said slot, the size coin determining the angular position of said pawl carrier relative to said coin carrier and the particular track followed by said pawl tip with turning movement of said drive shaft;

selectively operable clock setting means for setting said clock to operate for different periods of time;

and means in each clock setting track for selectively pivoting said pawl into and out of operative association with said clock setting means to operate said clock setting means during a predetermined portion of the travel of said pawl in each of said clock setting tracks.

7. A parking meter, comprising:

a clock;

a drive shaft;

means defining a plurality of arcuate tracks of different radial dimension concentric with said drive shaft, one of said tracks being an idle track and the other of said tracks being clock setting tracks;

a coin carrier connected to said drive shaft for swinging movement over said tracks in response to a turning of said drive shaft, said coin carrier including a coin receiving slot;

means continuously urging said coin carrier to a stop position for receiving coins through said coin receiving slot;

a normally open door for passing coins to said coin receiving slot in said coin carrier when said coin carrier is in said stop position;

means connected to said drive shaft for closing said door while said coin carrier is displaced from said stop position;

a pawl carrier pivotally connected to said coin carrier for swinging movement about an axis substantially parallel to said drive shaft;

coin engaging means carried by said pawl carrier;

a pawl carried by said pawl carrier for following different ones of said tracks depending upon the angular position of said pawl carrier relative to said coin carrier during a turning of said drive shaft;

means continuously urging said pawl carrier to swing said pawl toward said idle track and said coin engaging means against a coin in said coin carrier, the size coin determining the angular position of said pawl carrier relative to said coin carrier and the particular clock setting track followed by said pawl with turning movement of said drive shaft;

and means for selectively setting said clock to operate for predetermined periods of time in accordance with the particular track selected by said pawl and the movement of said pawl in said particular track.

8. A parking meter, comprising:

a clock;

a drive shaft;

means defining a plurality of arcuate tracks of different radial dimension concentric with said drive shaft, one of said tracks being an idle track and the other of said tracks being clock setting tracks;

a coin carrier connected to said drive shaft for swinging movement over said tracks in response to a turning of said drive shaft;

a pawl carrier pivotally connected to said coin carrier for swinging movement about an axis substantially parallel to said drive shaft;

coin engaging means carried by said pawl carrier;

a pawl carried by said pawl carrier for following different ones of said tracks depending upon the angular position of said pawl carrier relative to said coin carrier during a turning of said drive shaft;

means continuously urging said pawl carrier to swing said pawl toward said idle track and said coin engaging means against a coin in said coin carrier, the size coin determining the angular position of said pawl carrier relative to said coin carrier and the particular clock setting track followed by said pawl with turning movement of said drive shaft;

an arcuate ratch around said tracks;

ratch engaging means carried by said coin carrier;

means connected to said pawl carrier for maintaining said ratch engaging means out of contact with said ratch when said pawl is in said idle track and for moving said ratch engaging means into said ratch when said pawl is riding in a clock timing track;

and means for selectively setting said clock to operate for predetermined periods of time in accordance with the particular track selected by said pawl and the travel of said pawl within said particular track.

9. A parking meter, comprising:

a clock;

a drive shaft;

means defining a plurality of arcuate tracks of different radial dimension concentric with said drive shaft, one of said tracks being an idle track and the other of said tracks being clock setting tracks;

a coin carrier connected to said drive shaft for swinging movement over said tracks in response to a turning of said drive shaft;

a pawl carrier pivotally connected to said coin carrier for swinging movement about an axis substantially parallel to said drive shaft;

coin engaging means carried by said pawl carrier;

a pawl carried by said pawl carrier for following different ones of said tracks depending upon the angular position of said pawl carrier relative to said coin carrier during a turning of said drive shaft;

means continuously urging said pawl carrier to swing said pawl toward said idle track and said coin engaging means against a coin in said coin carrier, the size coin determining the angular position of said pawl carrier relative to said coin carrier and the particular clock setting track followed by said pawl with turning movement of said drive shaft;

means defining an annular shoulder around said tracks for engaging an edge of the coin in said coin carrier during swinging movement thereof, said shoulder having an opening for passing coins from said coin carrier when said coin carrier is over said opening;

a coin catcher receiving coins passing through said opening, said coin catcher including a trap door;

means for viewing the coins in said coin catcher;

means carried by said pawl carrier for opening said trap door during turning of said coin carrier and prior to the positioning of said coin carrier over said opening;

and means for selectively setting said clock to operate for predetermined periods of time in accordance with the particular track selected by said pawl and the travel of said pawl within said particular track.

10. A parking meter, comprising:

a clock;

a drive shaft;

means defining a plurality of arcuate tracks of different radial dimension concentric with said drive shaft, one of said tracks being an idle track and the other of said tracks being clock setting tracks;

a coin carrier connected to said drive shaft for swinging movement over said tracks in response to a turning of said drive shaft, said coin carrier including a coin receiving slot;

means continuously urging said coin carrier to a stop position for receiving coins through said coin receiving slot;

a pawl carrier pivotally connected to said coin carrier for swinging movement about an axis substantially parallel to said drive shaft;

coin engaging means carried by said pawl carrier;

means for urging said coin engaging means away from said coin receiving slot when said coin carrier is in and immediately adjacent said stop position;

a pawl carried by said pawl carrier for following different ones of said tracks depending upon the angular position of said pawl carrier relative to said coin carrier during a turning of said drive shaft;

means continuously urging said pawl carrier to swing said pawl toward said idle track and said coin engaging means against a coin in said coin carrier, the size coin determining the angular position of said pawl carrier relative to said coin carrier and the particular clock setting track followed by said pawl with turning movement of said drive shaft;

and means for selectively setting said clock to operate for predetermined periods of time in accordance with the particular track selected by said pawl and the travel of said pawl within said particular track.

11. A parking meter, comprising:

a clock;

a drive shaft;

a track carrying plate substantially normal to said drive shaft and including a plurality of arcuate tracks of different radial dimension concentric with said drive shaft, one of said tracks being an idle track and the other of said tracks being clock setting tracks;

a coin carrier connected to said drive shaft for swinging movement over said tracks in response to a turning of said drive shaft, said coin carrier including a coin receiving slot;

means continuously urging said coin carrier to a stop position for receiving coins through said coin receiving slot;

a pawl carrier pivotally connected to said coin carrier for swinging movement about an axis substantially parallel to said drive shaft;

coin engaging means carried by said pawl carrier;

a pawl pivotally connected to said pawl carrier on an axis substantially normal to said drive shaft for following different ones of said tracks depending upon the angular position of said pawl carrier relative to said cam carrier during turning of said drive shaft;

means urging a tip of said pawl to engage said track carrying plate;

means raising said pawl tip from said plate when said coin carrier is in and immediately adjacent said stop position;

means continuously urging said pawl carrier to swing said pawl tip toward said idle track and said coin engaging means against a coin in said slot, the size coin determining the angular position of said pawl carrier relative to said coin carrier and the particular track followed by said pawl tip with turning movement of said drive shaft;

selectively operable clock setting means for setting said clock to operate for different periods of time;

and means in each clock setting track for selectively pivoting said pawl into and out of operative association with said clock setting means to operate said clock setting means during a predetermined portion of the travel of said pawl in each of said clock setting tracks.

12. A parking meter, comprising:

a clock;

a drive shaft;

means defining a plurality of arcuate tracks of different radial dimension concentric with said drive shaft, one of said tracks being an idle track and the other of said tracks being clock setting tracks;

a coin carrier connected to said drive shaft for swinging movement over said tracks in response to a turning of said drive shaft;

a pawl carrier pivotally connected to said coin carrier for swinging movement about an axis substantially parallel to said drive shaft;

coin engaging means carried by said pawl carrier;

a pawl carried by said pawl carrier for following different ones of said tracks depending upon the angular position of said pawl carrier relative to said coin carrier during a turning of said drive shaft;

means continuously urging said pawl carrier to swing said pawl toward said idle track and said coin engaging means against a coin in said coin carrier, the size coin determining the angular position of said pawl carrier relative to said coin carrier and the particular clock setting track followed by said pawl with turning movement of said drive shaft;

a token holder;

means for individually ejecting tokens from said holder including an actuating arm;

means carried by said pawl carrier for swinging with said coin carrier to engage said arm and eject a token from said holder when the coin received by said coin carrier is of a predetermined size;

and means for selectively setting said clock to operate for predetermined periods of time in accordance with the particular track selected by said pawl and the travel of said pawl within said particular track.

13. A parking meter, comprising:

a clock having an output shaft and being adapted to operate for predetermined periods of time in accordance with the turning of said shaft in a predetermined direction;

a drive shaft;

means defining a plurality of arcuate tracks of different radial dimensions concentric with said drive shaft, one of said tracks being an idle track and the other of said tracks being clock setting tracks;

a coin carrier connected to said drive shaft for swinging movement over said tracks in response to a turning of said drive shaft;

a pawl carrier pivotally connected to said coin carrier for swinging movement about an axis substantially parallel to said drive shaft;

coin engaging means carried by said pawl carrier;

a pawl carried by said pawl carrier for following different ones of said tracks depending upon the angular position of said pawl carrier relative to said coin carrier during a turning of said drive shaft;

means continuously urging said pawl carrier to swing said pawl toward said idle track and said coin engaging means against a coin in said coin carrier, the size coin determining the angular position of said pawl carrier relative to said coin carrier and the particular clock setting track followed by said pawl with turning movement of said drive shaft;

and means in said clock setting tracks for selectively moving said pawl into and out of driving relationship with said clock output shaft to selectively turn said clock output shaft in said predetermined direction with a like turning of said drive shaft whereby said clock is selectively set to operate for different predetermined periods of time.

14. A parking meter, comprising:

a windable clock having an output shaft and being adapted to operate for predetermined periods of time in accordance with the turning of said output shaft in a predetermined direction to wind said clock;

a clock winding wheel connected to said clock output shaft;

a drive shaft;

means defining a plurality of arcuate tracks of different radial dimensions concentric with said drive shaft, one of said tracks being an idle track and the other of said tracks being clock winding tracks;

a coin carrier connected to said drive shaft for swinging movement over said tracks in response to a turning of said drive shaft;

a pawl carrier pivotally connected to said coin carrier for swinging movement about an axis substantially parallel to said drive shaft;

coin engaging means carried by said pawl carrier;

a pawl pivotally connected to said pawl carrier on an axis substantially normal to said drive shaft for following particular ones of said tracks depending upon the angular position of said pawl carrier relative to said coin carrier during turning of said drive shaft;

means continuously urging said pawl carrier to swing said pawl toward said idle track and said coin engaging means against a coin in said coin carrier, the size coin determining the arcuate position of said pawl carrier relative to said coin carrier and the particular track followed by said pawl with turning of said drive shaft;

and means in said winding tracks for selectively moving said pawl into and out of driving relationship with said winding wheel to selectively turn said winding wheel and said clock output shaft in said predetermined direction with like turning of said drive shaft whereby said clock is selectively set to operate for different periods of time.

15. A parking meter, comprising:

a windable clock having an output shaft being adapted to operate for predetermined periods of time in accordance with the turning of said shaft in a predetermined direction to wind said clock;

a clock winding wheel connected to said clock output shaft and having an arcuate series of spaced coupling means for registering with means for turning said winding wheel;

a drive shaft coaxial with said clock output shaft;

a track carrying plate substantially normal to said drive shaft and including a plurality of arcuate tracks of different radial dimension concentric with said drive shaft, one of said tracks being an idle track and the other of said tracks being clock winding tracks;

a coin carrier connected to said drive shaft for swinging movement over said tracks in response to a turning of said drive shaft;

a pawl carrier pivotally connected to said coin carrier for swinging movement about an axis which is parallel to said drive shaft and which follows said series of coupling means on said winding wheel with a turning of said coin carrier;

coin engaging means carried by said pawl carrier;

a pawl pivotally connected to said pawl carrier for turning about an axis substantially normal to said drive shaft with a first tip end of said pawl over said pivoting axis of said pawl carrier;

means urging a second tip of said pawl into engagement with said track carrying plate;

means continuously urging said pawl carrier to swing said second pawl tip toward said idle track and said coin engaging means against a coin in said coin carrier, the size coin determining the arcuate position of said pawl carrier relative to said coin carrier and a particular track followed by said second pawl tip with turning movement of said drive shaft;

and means in said winding tracks for selectively moving said first pawl tip into driving relationship with particular ones of said coupling means on said winding wheel to selectively turn said winding wheel and said clock output shaft in said predetermined direction with like turning of said drive shaft whereby said clock is selectively set to operate for different periods of time.

16. A parking meter, comprising:

a front support plate;

a back support plate;

removable means for fixedly stationing said front plate relative to said back plate;

a clock supported by said back plate and having an output shaft extending forward to said back plate, said clock being adapted to operate for predetermined periods of time in accordance with the turning of said output shaft in a predetermined direction to wind said clock;

a drive shaft;

a track carrying plate connected to said front plate and carrying a plurality of arcuate tracks of different radial dimension concentric with said drive shaft, one of said tracks being an idle track and the other tracks being clock winding tracks;

a coin carrier connected to said drive shaft for swinging movement over said tracks in response to turning of said drive shaft;

a pawl carrier pivotally connected to said coin carrier on an axis parallel to said drive shaft;

coin engaging means carried by said pawl carrier;

a pawl pivotally connected to said pawl carrier for turning about an axis substantially normal to said drive shaft;

means continuously urging said pawl carrier to swing said pawl toward said idle track and said coin engaging means against a coin in said coin carrier, the size coin determining the arcuate position of said pawl carrier relative to said coin carrier and the particular track followed by said pawl with turning movement of said drive shaft;

and means in said winding tracks for selectively moving said pawl into and out of driving relationship with said clock output shaft to selectively turn said clock output shaft in said predetermined direction with like turning of said drive shaft whereby said clock is selectively set to operate for different predetermined periods of time.

References Cited

UNITED STATES PATENTS

| | | |
|---|---|---|
| 2,213,240 | 9/1940 | Clausen. |
| 2,340,441 | 2/1944 | Toce et al. _____ 194—61 |
| 2,721,641 | 10/1955 | Eames. |
| 3,026,983 | 3/1962 | Hamilton. |
| 3,027,866 | 4/1962 | Sollenberger. |
| 3,126,995 | 3/1964 | Kissenger et al. ____ 194—102 X |
| 3,150,754 | 9/1964 | Greene. |
| 3,193,073 | 7/1965 | Michaels _____ 194—61 |
| 3,208,573 | 9/1965 | Carroll et al. _____ 194—2 |

ROBERT B. REEVES, *Primary Examiner.*

STANLEY H. TOLLBERG, *Examiner.*